Figure 1:
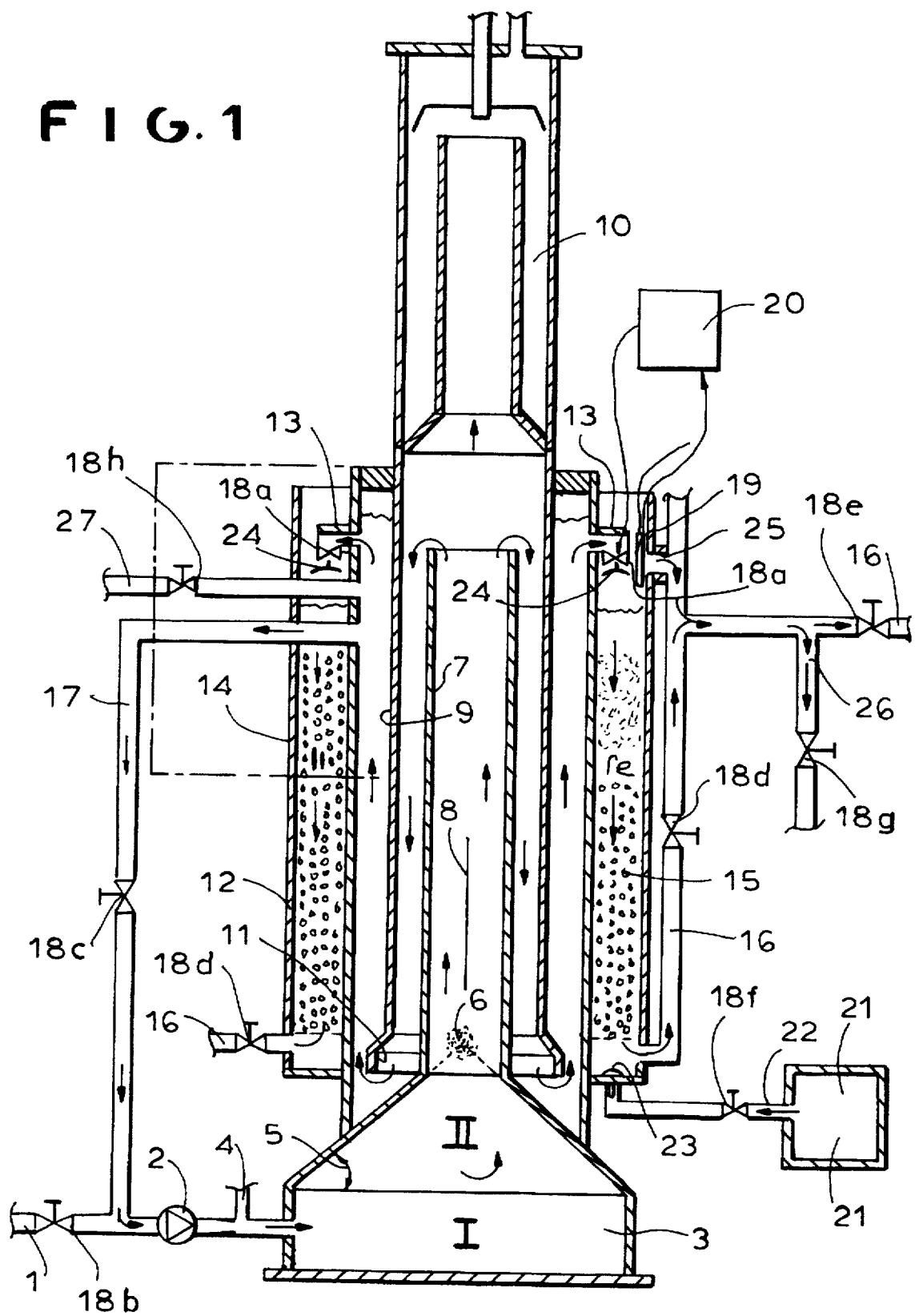

United States Patent [19]
Overath

[11] Patent Number: 5,776,335
[45] Date of Patent: Jul. 7, 1998

[54] GAS ENTRAINMENT FLOTATION REACTOR WITH ARRANGEMENTS FOR SEPARATING SOLIDS FROM LIQUIDS

[75] Inventor: Horst Overath, Jülich, Germany

[73] Assignee: Forschungszentrum Julich GmbH, Julich, Germany

[21] Appl. No.: 809,743

[22] PCT Filed: Sep. 1, 1995

[86] PCT No.: PCT/DE95/01192

§ 371 Date: Mar. 7, 1997

§ 102(e) Date: Mar. 7, 1997

[87] PCT Pub. No.: WO96/07483

PCT Pub. Date: Mar. 14, 1996

[30] Foreign Application Priority Data

Sep. 9, 1994 [DE] Germany .................. 44 32 042.6

[51] Int. Cl.⁶ .................. A01K 63/04; C02F 1/24
[52] U.S. Cl. .................. 210/169; 210/221.2; 210/194; 210/195.1; 210/266; 210/256; 210/259; 210/295; 210/108
[58] Field of Search .................. 210/169, 221.2, 210/266, 295, 256, 259, 260, 108, 99, 194, 195.1; 119/263, 264

[56] References Cited

U.S. PATENT DOCUMENTS 3,669,883 6/1972 Hucksted .
3,772,192 11/1973 Hucksted .
4,626,345 12/1986 Krofta .
4,834,872 5/1989 Overath .
5,064,531 11/1991 Wang .
5,078,867 1/1992 Danner .
5,192,423 3/1993 Duczmal .
5,282,962 2/1994 Chen .
5,320,750 6/1994 Krofta .

FOREIGN PATENT DOCUMENTS 2120436 3/1994 Canada .
0 274 083 A1 7/1988 European Pat. Off. .
2364181 9/1976 France .
2 315 988 1/1977 France .
1289353 2/1969 Germany .
1511077 5/1978 United Kingdom .
2162092 1/1986 United Kingdom .

Primary Examiner—Thomas M. Lithgow
Attorney, Agent, or Firm—Herbert Dubno; Yuri Kateshov

[57] ABSTRACT

A flotation/entrainment reactor is poured with a plurality of concentric tubes forming respective chambers, the tubewear for receiving and filtering a liquid from solids contained therein, and with an inlet cylindrical base receiving the liquid and guiding it and, a rising flow along a cone wall of a frustoconical cap mounted on the base to the region of formation of a foam column in one of the concentric tubes encompassing an imaginary apex of the cone wall of the cap.

8 Claims, 2 Drawing Sheets

5,776,335

GAS ENTRAINMENT FLOTATION REACTOR WITH ARRANGEMENTS FOR SEPARATING SOLIDS FROM LIQUIDS

SPECIFICATION

CROSS REFERENCE TO RELATED APPLICATIONS

This is a national phase application of PCT/DE95/01192 filed 1 Sep. 1995, and based in turn upon German application P4432042.6 filed 9 Sep. 1994 under the International Convention.

FIELD OF THE INVENTION

The invention relates to a gas-entrainment/flotation reactor, especially for the processing of liquids containing organic materials, with at least one feed tube opening into an inlet chamber to which a riser tube is connected and over which riser tube a foam tube extends, a foam-collecting device being provided at the upper end of the foam tube whose lower end opens into a lower region of a tubular casing, the upper end of which is provided with at least one liquid outlet.

BACKGROUND OF THE INVENTION

A gas-entrainment/flotation reactor of the above-described type is known from the European patent 0 274 083. For the treatment of water containing especially organic materials, the water is pumped through the feed tube into the inlet chamber and thereby supplied with air or an air-ozone mixture which is admixed in the form of the finest of bubbles with the liquid. The organic materials, for example, biomass, proteins, ammonia, among others, adhere to the bubbles and rise with them in the riser tube upwardly and enter the foam tube in which the organic-material-coated bubbles form themselves into a foam column. This foam column is pressed into a collecting device, connected at the upper end of the foam tube, by the rising gas bubbles. The bubbles which are not laden with organic material or which are charged with only small amounts of organic material flow oppositely in the foam tube in the region surrounding the riser tube downwardly to the lower end into a "suction expansion cone." There the flow slows to the extent that the gas bubbles again rise upwardly. As a result, there is found in the region between the foam tube and the riser tube an upwards and downwards movement of gas bubbles. During this upwards and downwards movement organic material still contained in the water deposits on the bubbles which collect into a foam joining the main foam column at the upper end of the riser tube. The bubble-free water, cleaned from organic substances, rises upwardly through the tubular casing and leaves the reactor through its liquid outlet.

A drawback this reactor is, of course, that a greater proportion of the solid substances found in the liquid or water, especially those with the same specific gravity as the liquid or of a greater specific gravity, cannot be removed and remain in the liquid are fed back to the system to be cleaned like, for example, an aquarium.

OBJECT OF THE INVENTION

It is thus the object of the invention to provide an apparatus with which solids can be removed from a liquid to be cleaned.

Another object is to provide an apparatus of the purposes described which is as compact as possible and is easily cleaned. Still another object is to provide an apparatus having small dimensions.

SUMMARY OF THE INVENTION

This object is attained in accordance with the invention in that the inlet chamber is composed of a cylinder-shaped lower part and a cap formed as a frustocone and set on the lower part. Into this, the feed tube opens tangentially into the lower part with the consequence that the liquid mixture flowing into the inlet chamber is set in rotation. Thus the solids with the same or a higher specific gravity than the liquid is forced outwardly against the wall while the solids with a lesser specific gravity accumulate in the central region of the rotating liquid column.

There also forms by the adhesion of floatable solids on the air or air-ozone bubble, a foam column. The angle between the cone base and the conical surface is so selected that the solids contained in the liquid and pressed toward the wall of the inlet chamber by the rotation of the liquid rises along the cone wall in the rising flow to a region that encompasses the apex of an imaginary cone at the location of the frustocone.

In this region, the solids deposit in the above-described forming foam column and are thus removed from the liquid. To remove the highest possible proportion of solids from the liquid to be cleaned, the angle between the conical surface and cone base preferably is between 30° C. to 60°C.

The feed tube preferably opens into the cylindrical lower part preferably midway of the height thereof into the inlet chamber as to achieve the most uniform gas bubble distribution possible in the liquid over the entire interior. This type of liquid inlet has the further advantage that the air bubbles remain for a greater residence time in the liquid so that the latter is better supplied with oxygen. In addition, in the aeration of the liquid with an air-ozone mixture, a better adhesion especially of proteins on the gas bubbles occurs. It has been established that the ozone requirement for the requisite positive charge of the neutral proteins for adhesion to the gas bubbles is approximately one-third of the requirements of counterflow columns known from the state of the art.

The reactor is, furthermore, provided above the apex of the imaginary cone in the riser tube with a device that converts the rotary flow of the liquid into a linearly upward flow in the riser tube. For this purpose, for example, ribs, struts, a partition or the like can be used. If the described flow conversion is not effected, the vortex continues high up into the foam tube with the effect that the foam is impacted and broken up and flows again to the lower portion of the reactor.

An alternative according to the invention for accomplishing the aforedescribed object surrounds the tubular casing with a further tube forming between them an intervening space equipped with a filter chamber and which can be filled with a filter material and provided with a liquid inlet and a liquid outlet.

The filter material which can be used in the device of the invention can be such as has been used in the small technical fields heretofore, for example, in the fields of aquaria, especially foamed substances filter cotton batting or percolation type filter materials, as well as materials which preferably are easily replaceable so that the filter chamber can be easily cleaned. For large technical use, as for example for nonclarified industrial waste water or in clarifier basins, delphinaria or the like, with solids which are removable depending upon the type, especially material like gravel, sand or coal. The filter chamber can be filled alternately with these materials so as to form a multilayer filter system.

The liquid inlet in the filter chamber forms preferably simultaneously the liquid outlet of the tubular casing. Furthermore, in the upper region of the filter chamber, above the filter material at least one liquid overflow is formed so that in the case in which the filter material becomes compacted with the retained solids and the liquid level in the filter chamber rises, the liquid can be conducted away from the filter chamber via the overflow. For measurement of the liquid level in the filter chamber, a sensor is provided above the filter material and registers a rise in the liquid level in the filter chamber. The sensor must, it will be self-understood, be so provided that a rise in the liquid level is signalled by the sensor before the liquid is discharged from the filter chamber via the overflow. Additionally, for cleaning the filter chamber, the lower region of the chamber is equipped with a device for introducing air and/or water. One such a device can for example be comprised of a nozzle which is connected to a flushing water vessel and or compressor.

The filter chamber according to the invention is preferably subdivided by one or more walls into two or more filter chambers. Thus at least one part of these filter chambers is equipped with overflow, sensor and device for introducing air and/or water.

Furthermore, the upper region of the filter chamber or filter chambers, can have a return tube so connected that the filter chamber or filter chambers at a maximum can be filled with filter material up to directly below the connection of the return tube. With liquids having a high proportion of floatable materials, these can be guided again to the gas-entrainment floatation reactor via the return tube whereby the feed to the filter chamber is suppressed in that, for example, a valve for the liquid outlet of the filter chamber can be closed.

The return tube can, as will be self-understood, also extend from an upper region of the tubular casing, whereby the liquid outlet of the tubular casing can be formed as the return tube. In this case, the feed to the filter chamber can be closed by a valve in the feed inlet to the chamber and a valve in the return tube or in a correspondingly formed liquid outlet of the tubular casing can be opened.

An optimal removal of solids from liquids with high solids proportions can be effected in the gas entrainment/flotation reactor which is equipped with an inlet chamber according to the invention as well as with one or more filter chambers according to the invention with or without the aforedescribed advantageous embellishments.

Especially with filter chambers containing filter materials which are suitable for large scale technical use (as for example gravel, sand and/or coal, compare above), a control device for simple cleaning of the filter material is provided. A precondition is that the filter chamber be equipped with overflow, sensor and device for introducing of air and/or water. If the filter material becomes compacted with retained solids, the liquid level rises above the filter material. Their provided sensor produces a liquid level signal to an electronic unit which closes the liquid inlet and outlet of the filter chamber as well as the inlet tube, for example, via valves, and simultaneously opens the unit for supplying air and/or water for a given time. The air and/or the water is introduced for example via a nozzle into the filter bed so that the filter material is forcibly stirred up. The solids are released from the filter material and are enriched in the liquid in the filter chamber. The thus solids-enriched liquid rises in the filter chamber and is guided away via the overflow into a waste water passage. As soon as the chamber is thus cleaned from solids, the opened parts of the device, namely, the device for feeding air and/or water, is again closed and the closed parts of the device, i.e. the liquid inlet and outlet to the chamber as well as the inlet tube, are again opened. The cleaning duration is either fixed and predetermined or is determined via a cloudiness measurement sensor which measures the cloudiness turbidity of the liquid, for example, at the overflow. For the control device, instead of electronic unit, an electrically actuated unit, for example, via a relay, can be used.

With the aforementioned control unit during the cleaning of the filter chamber, the gas entrainment/flotation rector is out of operation. In such cases, on the contrary, in which the liquid might be fed to the system to be cleaned without filtration, the electronic or electrical control will not close upon a signal generated from the sensor, the liquid inlet and outlet of the filter chamber and open for a given time not only the device for feeding air and/or water but also the outlet of the tubular casing over which the liquid can be fed unfiltered to the system to be cleaned. As soon as the filter chamber is cleaned, the open devices are again closed, and the closed devices are again opened so that the liquid is again filtered. Furthermore, a control device can be provided which has an electronic or electrical unit, upon signal emission of the sensor closes the liquid inlet and outlet of the filter chamber as well as the inlet tube and opens the device for feed or air and/or water as well into an upper region of the tubular casing at which the return tube is connected and is also open for this certain time. The unfiltered liquid is fed again to the reactor and during the cleaning of the filter chamber is circulated through the reactor. As soon as the filter chamber is cleaned, the opened parts of the device are again closed and the closed parts again opened and the circulated unfiltered liquid is again fed to the filter chamber for filtration.

The control device can have also further variations:

For example, through the electronic or electrical device, for the duration of the cleaning of the filter chamber, the return tube connected to the upper region of the tubular casing, and the outlet of the tubular casing can be opened so that a portion of the liquid is fed via the outlet of the tubular casing to the system to be cleaned and a portion is returned to the reactor via the return tube. As a result, this part of the liquid is mixed with further liquid fed through the inlet tube and to be cleaned.

To ensure filtration also during the cleaning phase of the filter chamber, reactors are used whose filter chamber is subdivided by one or more partitions into two or more filter chambers whereby at least a part of the filter chambers are equipped with overflow, sensor and device for the introduction of air and/or water. By signal emission of the sensor, one of the filter chambers, the electronic or electrical device closes its liquid inlet and outlet and opens the device for introducing air and/or water. Simultaneously, a filter chamber assigned to the chamber to be cleaned is also opened for the given time so that the liquid to be filtered during the cleaning period is passed through the assigned filter chamber and is filtered. After cleaning of the compacted filter chamber, the assigned chamber as well as the device for feeding air and/or water is again closed and the liquid inlet and outlet of the cleaned chamber is reopened so that the liquid again is passed through its filter system.

An alternative to the aforedescribed control device resides in that the assigned chamber in each case also is equipped with an overflow, sensor and a device for introducing air and/or water and both chambers are alternatively arranged: respectively one of the chambers is in filtration of the valve in the operating state while the other chamber is initially closed. With a signal emission of the sensor, i.e. and thus by compaction in the operating chamber this is closed off and the assigned chamber is opened. The newly opened chamber remains in operation during the cleaning phase by contrast to the aforedescribed control device, while the chamber to be cleaned remains closed following the cleaning period. This is then first reopened and remains open when the associated chamber is compacted and is cleaned. Thus there is an alternation of the operating states of the respectively associated chambers in an alternating sequence.

BRIEF DESCRIPTION OF THE DEAWING

Figure 1A:
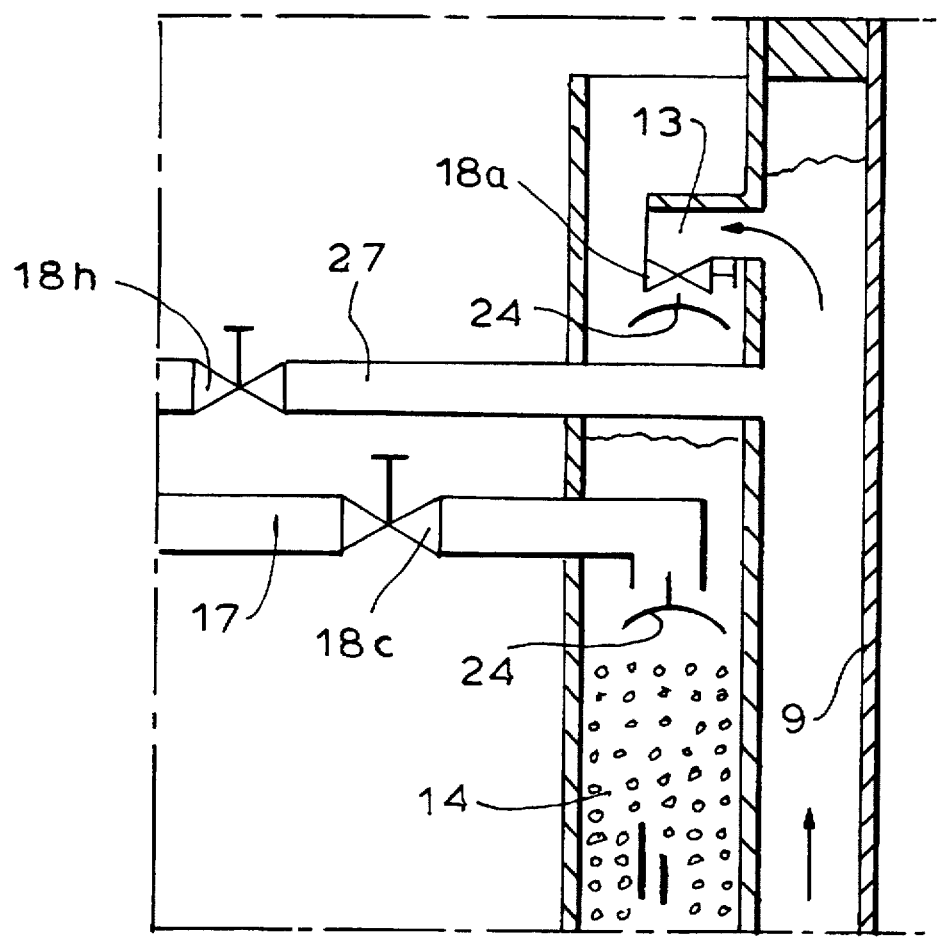

The above and other objects, features, and advantagaes will become more readily apparent from the following description, reference being made to the accompanying drawing in which:

FIG. 1 is a gas-entrainment floatation reactor with an inlet chamber and filter chamber or chambers in longitudinal section; and FIG. 1a is a partial illustration of the reactor according to FIG. 1 with an alternate return tube.

SPECIFIC DESCRIPTION

FIG. 1 shows a gas entrainment/floatation reactor with a feed tube 1 which introduces the liquid to be cleaned by means of a pump 2 into the inlet chamber 3. Prior thereto, the liquid passes through the injector 4 through which air or, as required, an air-ozone mixture is reacted, which mixes in finest of bubbles with the liquid.

The inlet chamber 3 is comprised of a cylindrical lower part I into which the inlet pipe 1 opens at an intermediate height thereof, tangentially and a frustoconically formed cap II with an angle 5 between the conical base and the conical wall of 45° C. By the tangential introduction of the liquid into the inlet chamber 3, the liquid is set into rotation whereby solids contained in the liquid are pressed against the wall of the cylindrically-shaped lower part I. The solid substances migrate along the conical wall into the region 6 which encompasses the apex of the imaginary cone formed by the frustocone. In this region the organic material contained in the liquid deposits on the gas bubbles to form a stable foam column in which the solids accumulate. The foam column carrying the solids and organic material rises in the riser tube 7 upwardly and passes the partition 8 provided in the cross section of the riser tube 7 and serving to convert the rotating flow formed in the inlet chamber 3 into a linearly rising flow in the riser 7. The rising liquid passes finally into the foam tube 9 which guides the foam column formed by deposition of organic material on the bubbles. The foam column is finally pressed by the rising gas bubbles into the foam collecting device 10.

The gas bubbles which have not been loaded with organic material or are only slightly charged with organic material flow downwardly in the foam tube 9 where it surrounds the riser tube 7 toward the lower end 11. The flow is there so slowed when the gas bubbles again rise upwardly. The bubble-free liquid rises through the tubular casing 12 upwardly and passes over the liquid inlet 13 into the filter chamber 15 formed between the tubular casing 12 and a tube 14. There, nonfloatable solid substances still possibly contained in the liquid are filtered out. The cleaned liquid is fed via the liquid outlet 16 finally again to the system to be cleaned.

For the case in which the liquid to be cleaned has an extremely high proportion of floatable materials, which are not completely removed in the first cleaning pass through the reactor, the liquid prior to filtration is guided by a return tube extending from the tubular casing 12 back to the inlet tube 1 and then to the reactor. For this purpose, the valve 18a in the left inlet 13 to the filter chamber 15 and the valve 18b in the inlet tube 1 are closed while the valve 18c in the return tube 17 is opened. The liquid is thus fed in circulation through the reactor until the floatable substances are removed from the liquid. Then the liquid is filtered in the filter chamber 18 in that the closed valves 18a and 18b, again opened and the valve 18c in the backflow tube 17 is again closed.

In the partial illustration of the reactor in FIG. 1a, the return tube 17, in contradistinction to the showing in FIG. 1, is connected at the upper portion of the filter chamber 15c. For the case in which the liquid to be cleaned should be fed in circulation through the reactor, the valve 18b in the feed tube 1 and the valve 18d in the liquid outlet 16 of the filter chamber 15 are closed while the valve 18a in the liquid feed 13 of the filter chamber 15 is opened. Through the additional opening of the valve 18c in the return tube 17 liquid backup in the filter chamber 15 is fed again to the reactor. After removal of the floatable substances from the liquid, filtration is effected in that the valves 18b and 18d are again opened and valve 18c is again closed.

Upon compaction of the filter material in the filter chamber 15 by retained solids, the liquid level rises in the filter chamber 15 and reaches initially the lower end of the sensor 19. This emits a signal to the electronic unit 20 which can carry out the following alternative control regimens:

1. The electronic unit 20 closes, upon emission of a signal from the sensor 19, via the valve 18a, the liquid inlet 13 into the filter chamber 15 and via the valves 18d and 18e, the liquid outlet 16 and via valve 18b, the inlet tube 1. Simultaneously the valves 18f and 18g are opened. By opening the valve 18f, water is pumped into the filter chamber 15 by means of the nozzle 23 via the line 22 from the flushing water container 21. As a consequence, the filter material in the filter chamber 15 is forcibly stirred up and the solids released from the filter material. To avoid blockage by the released dirt particles of the valve 18a in the liquid inlet 13 to the filter chamber 15, or contamination of the backflow tube 17 according to FIG. 1a, the corresponding openings are equipped with a baffle 24. The water enriched with the solids is discharged by the overflow 25 through 20 the waste water line 26. After cleaning of the filter chamber 15 for a given time, the valves 18a, 18b, 18d and 18e are again opened while valves 18f and 18g are again closed.

2. By contrast to the aforedescribed control regimen, in another control regimen, of the invention, the valve 18b of the inlet 1 remains open and additionally the valve 18h at the outlet of the tubular casing 12 is opened. This has the consequence that the liquid from the reactor during the cleaning phase is fed unfiltered via the outlet 27 to the system to be cleaned.

3. Alternatively to the control regimen described at 2 in still another control regimen, instead of the valve 18h from outlet 27, the valve 18a from return tube 17 is opened and the valve 18b of the inlet tube 1 is closed. During the cleaning of the filter chamber 15, the liquid is thus fed in circulation through the reactor until after the cleaning phase, the filter chamber 15 is again opened for filtration.

The following control regimen possibility (according to claim 16) requires that right (re) and left (li) filter chambers be separated by a wall from one another and that, for filtration of the liquid, only the right chamber is in operation.

4. By compaction of the filter material of the right chamber 15, by solids, valve 18a of the liquid inlet 13 and valves 18d and 18e of liquid outlet 16 are closed and valve 18g of the waste water line 16 as well as valve 18f for the cleaning process are opened. Simultaneously, the valve 18a for the left filter chamber is opened from the liquid inlet 13 and valve 18d from the liquid outlet 16 is opened so that during the period of cleaning of the right filter chamber, the liquid is filtered through the left filter chamber. After the cleaning phase, the valves 18a and 18d of the left filter chamber are again closed while the right filter chamber is again opened to filtration.

I claim:

1. A gas entrainment/floatation reactor comprising:

at least one feed pipe conveying a liquid to be purified and supplied with air or air-ozone mixture which is admixed as the finest of bubbles with the liquid;

an inlet chamber extending along an axis and in flow communication with the feed pipe which opens tangentially into the chamber;

a riser tube coaxial with and mounted on and being in flow communication with the chamber for guiding a foam column;

a foam pipe coaxial with the chamber and spaced radially outwardly from the riser tube and formed with lower and upper ends, the riser tube terminating between the ends, so that the foam column overflows into a space between the tube and pipe;

foam collecting means formed in the foam pipe on the upper end thereof for collecting the bubbles overloaded with organic material rising in the space toward the upper end of the foam pipe; and a tubular casing coaxial with and spaced radially outwardly from the foam pipe to form another space therebetween and being in flow communication with the lower end of the foam pipe to guide axially upwardly the liquid evacuated from the foam pipe, the casing having at least one liquid outlet spaced upwardly axially from the lower end of the pipe and draining the liquid from the other space, the chamber being formed with a cylindrical base having the feed pipe tangentially connected there to and a frustoconical cap on the base having a cone wall extending at an angle with respect to the base so that the liquid entering the base is guided along the cone wall in a rotary raising flow to a region of formation of the foam column in the raiser tube encompassing an imaginary apex of the wall of the cap.

2. The reactor defined in claim 1 wherein the angle is in a range of 30° C. to 60° C.

3. The reactor defined in claim 1 wherein said feed pipe opens into the cylindrical base midway of a height of the base.

4. The reactor defined in claim 1 wherein the riser tube is formed with means for converting the rotary flow of said liquid into a rising linearly flow upstream from said apex.

5. The reactor defined in claim 1, further comprising another tube spaced radially outwardly from the tubular casing and forming a respective filter chamber therebetween which is filled with a filter material and is formed with a respective liquid outlet spaced axially downwardly from the liquid outlet of the casing and being in flow communication with said feed pipe.

6. The reactor defined in claim 5 wherein said filter chamber is provided with outlet means for evacuating liquid outflow formed between said liquid outlet of the casing and filter material, detecting means for detecting a level of liquid in said filter chamber spaced axially upwardly from the outlet means, and means for introducing air or water formed on a bottom of the filter chamber and spaced axially downwardly from the liquid outlet of the filter chamber.

7. The reactor defined in claim 5 wherein said filter chamber is provided with at least one partition subdividing the filter chamber into a plurality of compartments.

8. The reactor defined in claim 5 wherein said filter material filling the filter chamber terminates at most directly below the outlet of the filter chamber.

* * * * *